Jan. 27, 1931.  A. C. HALLER  1,790,144
WING CONSTRUCTION FOR AEROPLANES
Filed Sept. 5, 1929
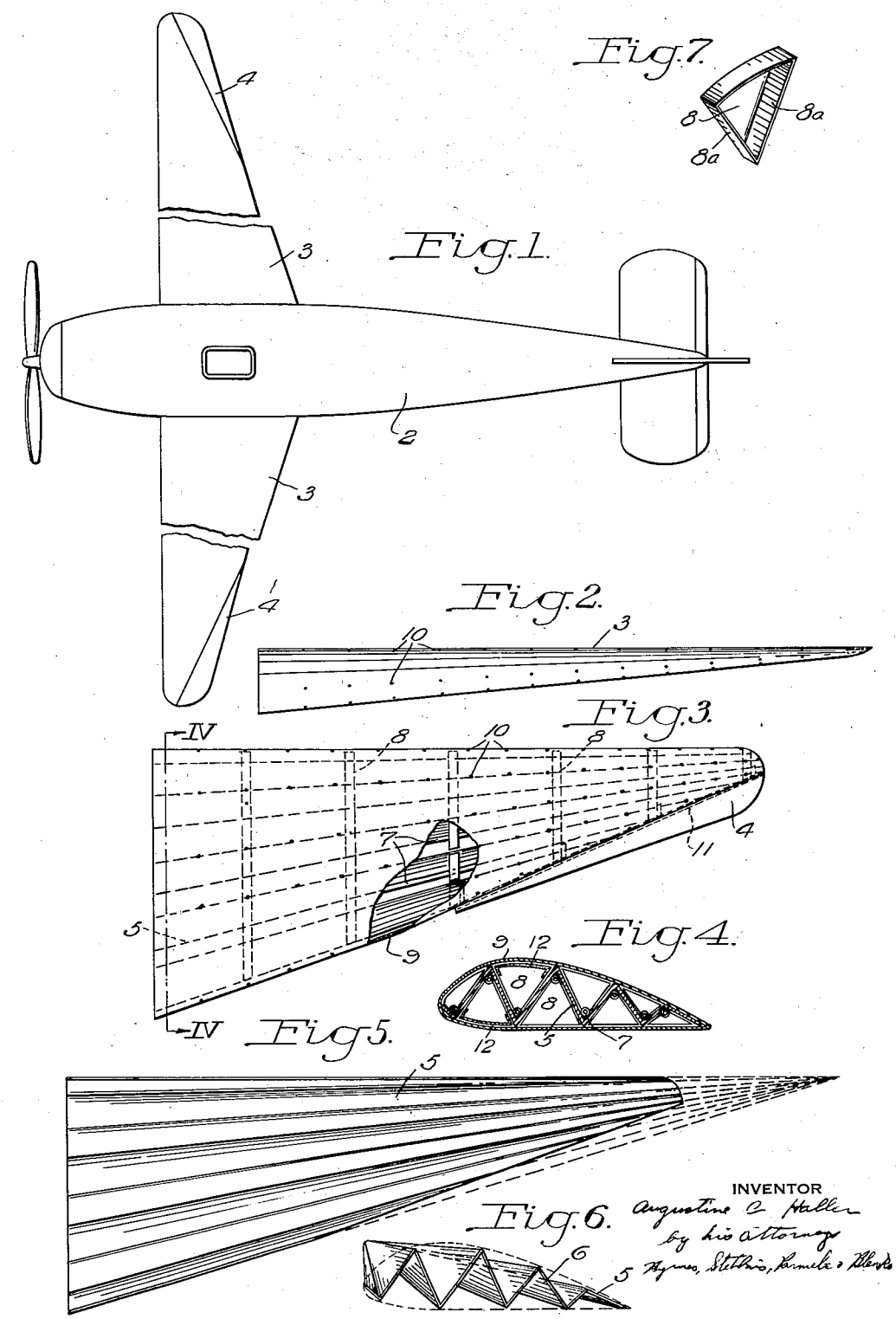
INVENTOR
Augustine C. Haller
by his attorneys Patented Jan. 27, 1931

1,790,144

UNITED STATES PATENT OFFICE

AUGUSTINE C. HALLER, OF PITTSBURGH, PENNSYLVANIA

WING CONSTRUCTION FOR AEROPLANES

Application filed September 5, 1929. Serial No. 390,455.

This invention relates to aeroplanes, and more particularly to a wing structure therefor.

Investigation regarding the efficiency of air foils has demonstrated that an aeroplane wing has a greater efficiency when it is tapered in width from the fuselage outwardly and is also a decreasing thickness from the fuselage outwardly. It has also been demonstrated that the greatest lift is secured when the maximum vertical ordinate is approximately one-third of the width of the wing back from the entering edge of the wing.

As heretofore commonly constructed the wing has been formed by a covering stretched over a series of transverse ribs of truss-like structure at spaced intervals outwardly, these ribs being connected by longitudinally extending spars. The structure has imposed a limitation on the manner in which the skin or covering can be secured to the bracing structure. Unless the ribs are quite close together the covering does not have the maximum rigidity transversely of the wing, and the structure is one which is slow and expensive to manufacture.

In some planes wherein the skin of the plane is formed of sheet metal, such as aluminum, the practice has been to corrugate the metal of the skin in order to develop greater transverse strength, the corrugations extending transversely of the wing. Experiments have shown however that the provision of corrugations on the surface of the wing decreases the efficiency of the wing to a very appreciable extent.

According to the present invention there is provided a wing structure which permits the wing to have a shape suited for developing the maximum efficiency, wherein a smooth skin can be used, the skin being attached and supported by the bracing structure of the wing over a large area. The structure is cheaper to manufacture than the present type of wing, it can be more easily fabricated, and can develop greater strength with less weight than wings of the present design.

The invention may be readily understood by reference to the accompanying drawings in which Figure 1 represents a plan view of an aeroplane having wings of the type contemplated by my invention.

Figure 2 is a view of the entering edge of one of the wings.

Figure 3 is a plan view of one of the wings.

Figure 4 is a section substantially in the plane of line IV—IV of Figure 3.

Figure 5 is a plan view of the spar structure.

Figure 6 is an end view of the structure shown in Figure 5.

Figure 7 is a perspective view of one of the reinforcing elements used to give transverse rigidity to the structure.

In the drawings 2 designates the fuselage of an aeroplane having wings 3 which are of outwardly decreasing width and thickness. The wings are provided with ailerons 4 which are hinged to the wing structure in the manner hereinafter described. The shape of the wings conforms to the shape which has been found by demonstration to give the greatest efficiency.

According to the invention the wing has a bracing structure in the form of a web of sheet metal, wood or other suitable material 5 which has a series of longitudinally extending corrugations 6 therein, these corrugations converging outwardly, the longitudinal axes of the corrugations, if extended as indicated by the dotted lines in Figure 5, coming to a point of intersection. The corrugations, besides converging are of outwardly decreasing depth. The corrugations are substantially V shaped, so that the structure viewed from either surface has a plurality of peaks and valleys. At any point in the wing the first corrugation at the entering edge is relatively shallow to support the entering edge against collapse while the next corrugation is relatively high. The corrugations increase in height at any point in the length of the wing from the entering edge toward the point of maximum thickness in the wing which is about one-third of the distance from the entering edge to the trailing edge of the wing.

From the point of maximum thickness the corrugations are of gradually decreasing depth to the trailing edge.

The sheet metal web may be of relatively light material, and yet, by reason of the depth of the corrugations, have a very considerable transverse longitudinal strength. Should it be desired to increase the longitudinal strength of the structure tubular reinforcing elements may be placed and secured in the bottoms of the troughs on each surface of the wing. Such reinforcing elements are shown in Figure 4, and are designated 7.

In order to provide transverse strength to the structure gusset plates or other suitable bracing members 8, are placed in the troughs between the corrugations. It is preferred that these bracing elements be arranged in line transversely of the wing and that a transverse series of them be arranged at substantially regular intervals out from the inner end of the wing. These reinforcing members may be relatively thin sheet metal and may have flanged edges $8^a$ which are welded or riveted to the face of the corrugations. The members 8 may also assist in holding the covering for the wing in the proper shape.

The bracing structure is covered with a fabric or metal coating 9. A metal coating or skin is preferably employed, and it is secured to the bracing structure by rivets 10 that pass through the corrugated web. By reason of the fact that the corrugations are continuous throughout the length of the wing the covering can be firmly supported and intimately attached to the bracing structure. In other words, the rivets can be positioned relatively close together, not being dependent upon the location of any transverse ribs or braces in the interior bracing, as has heretofore been necessary.

The ailerons 4 are hinged to the outer portions of the trailing edge of the wings, their construction being of the usual type and the hinge 11 being of any suitable or preferred type. Piano hinges are preferably employed. The axes about which the ailerons hinge are diagonal to the axes of the corrugations so that the axes of the hinge intersects the axes of a plurality of the corrugations, as will be evident from an inspection of Figure 3. The hinge 11 which carries the aileron may therefore be supported or connected to a plurality or corrugations, rather than being carried by any one single corrugation. In this way the torque of the aileron is transmitted across an appreciable portion of the width of the wing and is not concentrated on the bracing structure at any one point. By reason of this arrangement it is, of course, possible that the corrugated web be of lighter gauge metal than would be required if the aileron were supported from a single corrugation.

A wing made in accordance with the present invention may have the shape which has been best suited for efficiency in aeroplanes. It is interiorly braced in a mechanically sound fashion, the strength of the wing increasing toward the inner end as the load increases, the wing having its greatest strength at its inner end adjacent the fuselage where the greatest load is placed upon it. The covering or skin over the bracing structure has a substantially continuous support, and it can be attached to the supporting structure at close intervals.

Through the employment of the transverse webs 8 and the longitudinally extending tubes 7, which may be welded or otherwise rigidly connected to the corrugated web, the corrugated web can be extremely light gauge metal. Furthermore, the use of light gauge metal is made possible by reason of the fact that the torque of the ailerons is distributed over a considerable portion of the width of the corrugated web, rather than being concentrated along any one corrugation thereof.

While I have described the corrugated reinforcing structure as being comprised of sheet metal, it will be understood that this corrugated web may be made of any other material suitable for the purpose. For instance, ply wood may be used, or molded fibrous composition may be used provided it has the necessary strength and lightness. Also the reinforcing members 7 may be made in the form of angles instead of tubes, or may be made of wood and may be of any desirable cross-section. Where the web is made up of ply wood, it would be preferred to use wooden reinforcing strips. It will also be understood that instead of riveting the skin covering to the web, it may be welded or soldered or otherwise secured where the material used permits such other operation.

By closing the troughs between the corrugations by closure plates, such as indicated at 12 in Figure 4, ballast tanks or fuel tanks may be formed directly in the wing with practically no additional cost and very little additional weight. The neutral slope and inclination of the web serves to secure drainage in the proper direction. Where closure plates such as 12 are employed, the transverse webs 8 may form the end walls for such compartments. Where the compartment extends throughout the greater portion of the length of the wing, the webs which are intermediate the ends of the compartment may be properly perforated to prevent communication continuously along the compartment. Obviously if the skin of the wing is of metal and is welded to the peaks of the corrugations, the extra plates 12 could be dispensed with, the wing itself thereby serving to provide one wall of the compartment.

While I have illustrated a preferred embodiment of my invention, it will be understood that various modifications and changes may be made therein, within the contemplation of the following claims and that the invention is not restricted to the construction herein specifically shown and described.

I claim:

1. In an aeroplane wing a spar comprising a longitudinally corrugated integral web extending lengthwise of the wing structure, transverse bracing members connecting the corrugations, and a covering over the corrugated web and secured thereto.

2. In an aeroplane wing, a spar structure comprising a corrugated web extending lengthwise of the wing, transverse gussets in the troughs of the corrugations and secured to the sides of the corrugations for reinforcing the structure, and a covering over the corrugated web and secured thereto.

3. In an aeroplane wing, a spar comprising a corrugated web extending lengthwise of the wing structure, the corrugations extending lengthwise thereof, tubular reinforcing members in the troughs of the corrugations and extending lengthwise of the structure, bracing members extending transversely of the structure connecting the corrugations, and a covering over the corrugated web and secured thereto.

4. In an aeroplane wing of outwardly decreasing width and thickness, a corrugated bracing structure having convergent ribs of outwardly decreasing height, a skin over the bracing structure and secured thereto for covering the same, and an aileron hinged to the wing, and having the axis about which it hinges diagonal to the corrugations of the web, the hinge for the aileron being attached to a plurality of the corrugations of the web.

5. In an aeroplane wing structure, a corrugated web having V-shaped corrugations of increasing height from the entering edge of the plane to the point of maximum wing thickness and decreasing height from this point to the trailing edge of the wing, said corrugations being of longitudinally diminishing depth and converging outwardly, transverse bracing elements between the corrugations for imparting transverse rigidity to the structure, a covering over the web and adapted thereto, and ailerons carried on the web and having a hinge connection thereto on a plurality of the corrugations.

6. In an aeroplane wing of outwardly decreasing width, a longitudinally corrugated bracing structure having outwardly convergent ribs, bracing means between the corrugations for giving transverse rigidity to the web, an aileron hinged to the web, the axis of the hinge of the aileron intersecting a plurality of the corrugations of the web, the hinge for the aileron being secured to the web at the points of intersection.

7. In an aeroplane wing structure, a longitudinally corrugated web having transverse gussets in the corrugations thereof and a skin covering for the web, said wing having a compartment therein, some of the walls of which are formed by the corrugations of the web and the end walls of which are formed by said transverse bracing gussets.

8. In an aeroplane wing structure, a longitudinally corrugated web having transverse gussets in the corrugations thereof and a skin covering for the web, said wing having a compartment therein, some of the walls of which are formed by the corrugations of the web and the end walls of which are formed by said transverse bracing gussets, another wall of the compartment being formed by the skin of the wing.

In testimony whereof I have hereunto set my hand.

AUGUSTINE C. HALLER.